ical Systems", Chemical
United States Patent [19]

Yonezawa

[11] Patent Number: 4,975,827
[45] Date of Patent: Dec. 4, 1990

[54] OPTIMIZED PROCESS CONTROL METHOD AND APPARATUS THEREFOR

[75] Inventor: Kenzo Yonezawa, Tama, Japan

[73] Assignee: Kabushiki Kaisha Toshiba, Kawasaki, Japan

[21] Appl. No.: 324,784

[22] Filed: Mar. 17, 1989

[30] Foreign Application Priority Data

Mar. 17, 1988 [JP] Japan .................................. 63-64332

[51] Int. Cl.⁵ .............................................. G05B 19/04
[52] U.S. Cl. .................................... 364/151; 364/153; 364/148
[58] Field of Search ................ 364/148, 149, 150, 151, 364/152, 153, 154, 578, 221.9, 921.5, 916, 221; 422/3

[56] References Cited

U.S. PATENT DOCUMENTS 3,828,171  8/1974  Griffin .................................. 364/153
4,607,325  8/1986  Horn .................................... 364/151
4,698,745  10/1987  Hiroi et al. ........................... 364/165

OTHER PUBLICATIONS

"Simplex Optimization of Chemical Systems", Chemical Education, American Chemical Society, vol. 56, No. 5, 5/79.

*Primary Examiner*—Jerry Smith
*Assistant Examiner*—Paul Gordon
*Attorney, Agent, or Firm*—Foley & Lardner, Schwartz, Jeffery, Schwaab, Mack, Blumenthal & Evans

[57] ABSTRACT

An optimized process control method comprises the steps of: delivering an operation variable to a control system model device which includes one or more model equations which are so modeled that the output obtained when the same process value is delivered to a control object process, is within a predetermined tolerable range and which receives the valve representative of the condition of a real process; receiving an evaluation function which is the result of the arithmetic operation of the one or more model equations, thereby causing the control system model device to carry out an operation for searching for a first optimum control point; defining said first optimum point as an initial value and outputting a set value for the real process from the region whose center is the initial value and which is within an allowable degree of error with respect to a true optimum point; and in response to the set value, searching for a second optimum point for the real process on the basis of the value representative of the condition of the real process according to a trial-and-error searching optimization algorithm, such as simplex method. An optimized process control apparatus which realize the method is also disclosed.

4 Claims, 7 Drawing Sheets

OPTIMIZED PROCESS CONTROL METHOD AND APPARATUS THEREFOR

BACKGROUND OF THE INVENTION

The present invention relates to an optimized process control method and apparatus therefor.

In the series of steps for the planning, designing, construction and operation of an apparatus or system, it is very important to obtain a maximum profit or to reduce the overall cost to the minimum in every case, which is generally called "the optimization problem" in the art. Process control is directly related with the operation of an apparatus so that it is an object of optimization.

In the case of the optimization of process control, the operational conditions to attain maximum profit are obtained based on variables such as rate of feed of a material or fuel and so on, temperature, pressure, etc., and these operational condition values are determined as set values of the control loops.

In order to optimize a process, it is a rule of thumb to understand and model the object process. In practice, in process control, the object systems which must be optimized are almost always of nonlinear characteristics. Moreover, the problem to be solved will be a nonlinear planning problem of the order of n, where n is the number of variables.

Figure 1:
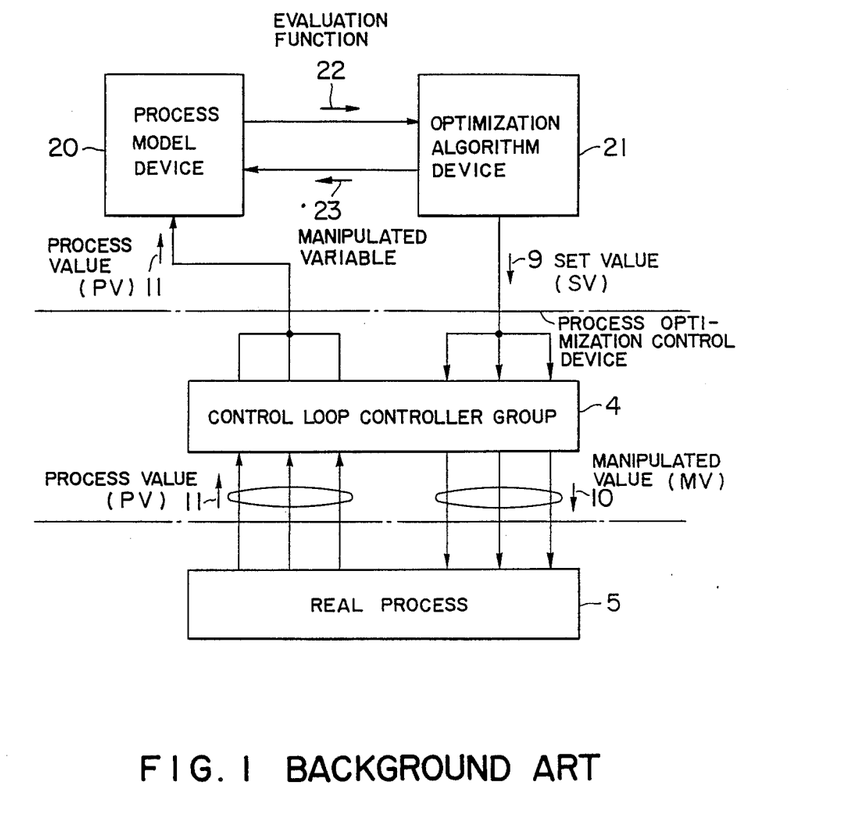
FIG. 1 is a block diagram schematically illustrating a conventional optimized process control apparatus incorporation therein a process model device.

FIG. 1 is a block diagram illustrating a conventional system to be optimized.

This system is equipped with a control loop controller group 4 in order to apply manipulated values (MV) such as the degree of opening of valves, the electric power to be supplied and so on, to a real process 5 such as a plant or the like and also to derive process values (PV) representative of temperatures, flow rates and so on. The controller group 4 is connected to an optimization algorithm device 21 and a process model device 20 which constitute an optimized control device. The optimization algorithm device 21 is a kind of an arithmetic unit used to attain various arithmetic operations in order to attain a maximum optimization and outputs the results or set values (SV) so as to cause the controller group 4 to deliver the manipulated values (MV) to the real process 5. The process model device 20 is a component part in which a process model is stored and it applies the process values (PV) received from the controller group 4 to the process model equations.

The optimization algorithm device 21 delivers manipulated variables 23 to the process model device 20 and obtains the evaluation functions 22 which are representative of optimized operational conditions which are obtained by the process model device 20. The evaluation functions 22 are solved and the optimum variables are delivered to their respective control loops 4.

When there are n variables and the evaluation function is expressed as $f(x_1, x_2, \ldots, x_n)$, the process for obtaining the value of each variable at which the evaluation function f has a maximum or minimum value is the optimization problem. In order to solve this problem, it suffices to obtain a differential coefficient of the evaluation function f, but in general this cannot be obtained by analytic methods.

Meanwhile in the case of the optimum control of a control system of a plant which is so complicated in its physical and chemical behaviors that it is difficult to make a realistic model, in general, few computers have been able to incorporate practical process model equations.

As one example of the optimized control systems, a kraft recovery boiler combustion control system in the paper and pulp industry may be considered. In this system, the kraft recovery boiler has the double function of generating steam as in the case of other general boilers and recovering the chemical agents added, during the process of crushing tips with steam.

The fuel for the kraft recovery boiler is a waste liquid called black liquor obtained in the process of steam digesting of tips. Black liquor contains not only inflammable organic components included in the tips, but also the chemical agents (soda) added in the process of steam digesting the tips. Inflammable organic components are burned and the heat obtained by this combustion is derived in the form of steam. The chemical agent is contained in black liquid in the form of Glauber's salt (Sodium Sulfate: $Na_2SO_4$). Because of the reduction reaction, it becomes smelt (sodium sulfide: $Na_2S$) and is recovered from the bottom of the furnace in the form of a liquid. It follows therefore that in order to recover the chemical agents, the deoxidation atmosphere for causing such a reduction reaction must be formed. In order to form such an atmosphere within the furnace, it is required to form the semi-dried deposite of black liquor called a char bed, which in turn must be burned. Black liquor sprayed into the furnace drops while its water content is derived by radiant heat resulting from the combustion so that the char bed is formed at the bottom of the furnace. The combustion air is blown into each stage within the furnace in such a way that it surrounds the char bed.

Unlike general boilers, two of the most important objects in the optimized combustion control of the recovery boiler are (1) not only to increase the thermal efficiency of the boiler (2) but also to increase the recovery rate of the chemical agent; that is, to increase the degree of reduction of smelt. Furthermore, in order to prevent atmospheric pollution, the discharge of $SO_x$, $NO_x$, TRS (Total Reduction Sulphur) and so on must be reduced to a minimum.

The manipulated variable in the optimum combustion control of the kraft recovery boiler is the combustion air which is blown into the bottom of the char bed and over its surface and the space above it.

In the case of optimum control for the kraft recovery boiler, a suitable quantity of air must be distributed and blown into the furnace. In order to realize such optimum control, the model equations of the object process must be preferably defined as described above. However, unlike the general boilers, the chemical reactions and physical behaviors in the furnace of the recovery boiler are extremely complex so that it is almost impossible to analyze the above-mentioned phenomena and to define a practical model.

Figure 2:
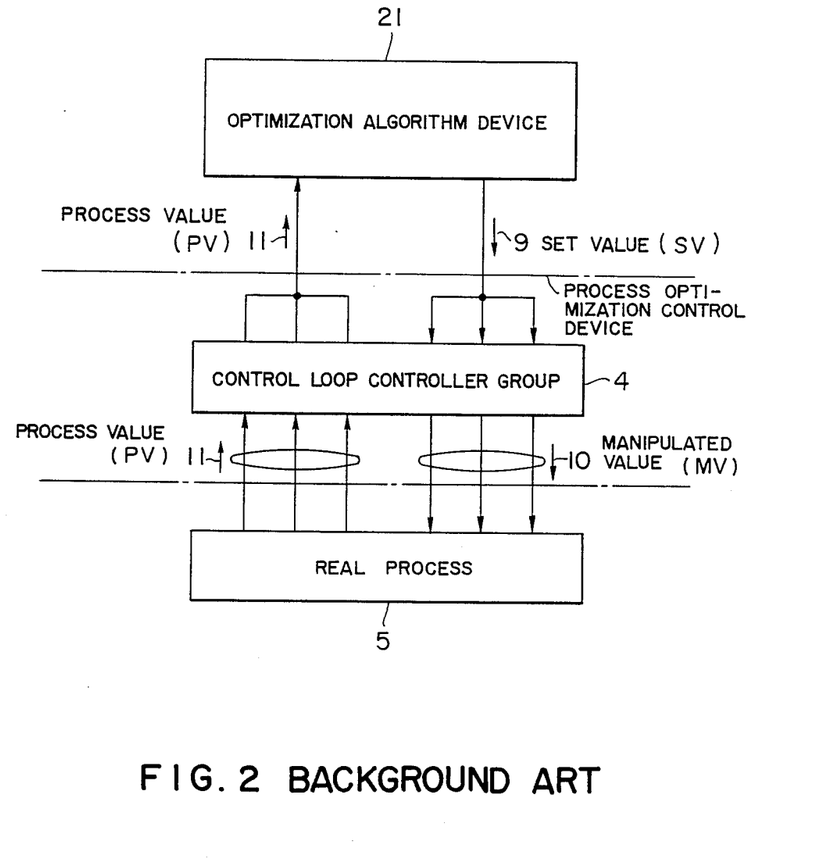
FIG. 2 is a block diagram schematically illustrating a conventional optimized process control apparatus of the type for obtaining an optimum value by directly interfering a real process.

In this case, the process model device 20 shown in FIG. 1 is eliminated as shown in FIG. 2 and the process itself is assumed to include a process model in the form of a black box, thereby searching for an optimum point. That is, the determination of an optimum point is carried out in such a way that the manipulated values 10 are directly varied depending upon set values (SV) 9 and in accordance with an optimization algorithm so as to interfere the process. In this case, the evaluation function for determining an optimum point is directly obtained using the process values (PV) 11 in the plant which is in the form of a feedback value of the manipulated variables.

That is, the air amounts charged into three different portions in the furnace, which are the manipulated variables, are varied in accordance with an optimization algorithm so as to determine an optimum point in a trial and error manner. As a result, an optimum point can be determined without directly interfering with the process. In this case, the evaluation function required for the determination of an optimum point is computed from process values (PV). For instance, both of the steam generating efficiency and the additive agent recovery rate are taken into consideration so that the nonlinear combined equation of the boiler efficiency, the temperature of the surface of the char bed and the analyzed value of the concentration of the exhaust gas is used as an evaluation function. As an optimization algorithm for determining an optimum point in a trial and error manner, a nonlinear simplex method, a complex method which is a modification of the nonlinear complex method so that the modified complex method can be utilized even when certain limited conditions exist, other modifications of the nonlinear simplex method or the like may be used. Of these methods the simplex method has been widely used.

According to the simplex method, a simplex which is an initial value consisting of $(n+1)$ points geometrically arranged on $R^n$ (n-dimension) is first generated and at each point, the value of the evaluation function $f(x_1, x_2, \ldots, $ and $x_n)$ is compared so that in response to the result of the comparison, the simplex is moved by one point every one fundamental operation, thereby approaching a point at which the evaluation function has a minimum value.

According to this method, need not to obtain a differential coefficient so that the method can be applied to a case in which correct model equations of the process cannot be defined. As a result, this method has a feature that the optimum control can be carried out with a high degree of accuracy.

However, in the case of the method in which the real process is directly utilized so as to search for and determine an optimum point, the operation continues even from the time when the search is started to the time when an optimum point is determined (search is converged), the optimum operation is not carried out during that interval. As a result, according to such trial and error searching method, the process may be carried out at a point in the vicinity of the worst point even for a short time interval. As a consequence, there arises the problem that pollutants are discharged.

The evaluation function which is an important element in the search and determination of the optimum point is computed on the basis of the process values (PV) including external disturbances exerted upon the process. Especially in the case of the kraft recovery boiler of the type described above, variations in the composition of black liquor between lots of pulp materials and external disturbances such as the adhesion of hume to the furnace wall occur very frequently. Therefore because of a sudden disturbance, the process is adversely affected temporarily so that an evaluation function which is useless is obtained. Consequently, the optimum point search and determination process is delayed. Furthermore, even after an optimum point is defined, the optimum point search and determination process is resumed due to the external disturbances.

Moreover, in the case of defining an optimum point by using the simplex method and in the case of a simplex consisting of a plurality of points, since the simplex moves only to one vertex point in each fundamental operation that when there exist many variables, the movement of the simplex is low and the determination of an optimum point is delayed. As a result, there arises the problem that a long period of time from the starting of the search to converge is required so that the operation is adversely affected.

SUMMARY OF THE INVENTION

In view of the above, it is an object of the present invention to provide an optimized process control method and an apparatus therefor which can quickly determine an optimum operation point without being adversely affected by external disturbances even in processes in which practical process definitions are difficult due to the complex physical and chemical behaviors of the process.

According to the present invention, there is provided an optimized process control method comprising the steps of delivering an operation variable to a control system model device which includes one or more model equations which are so modeled that the output obtained when the same process value is delivered to a control object process, is within a predetermined tolerable range and which receives the value representative of the condition of a real process; receiving an evaluation function which is the result of the arithmetic operation of the one or more model equations, thereby causing the control system model device to carry out an operation for searching for a first optimum control point defining said first optimum point as an initial value and outputting a set value for the real process from the region whose center is the initial value and which is within an allowable degree of error with respect to a true optimum point; and in response to the set value, searching for a second optimum point for the real process on the basis of the value representative of the condition of the real process according to a trial-and-error searching optimization algorithm.

According to the present invention, there is also provided an optimized process control apparatus comprising a control system modeling device which includes one or more model equations which are so modeled that the output obtained when the same process value is delivered to a control object process is within a predetermined range and receives a value representative of the condition in a real process a control model searching point searching device which receives an evaluation function which is the result of the arithmetic operation by the one or more model equations when an operation variable is delivered to the control system modeling device, thereby searching for a first optimum point with respect to the control system model and a real process optimum operation point searching device which defines the first optimum control point delivered from the control model searching point searching device, which outputs a set value for the real process from a region whose center is said initial value and which is within an error from a real optimum point and which, in response to the value representative of the condition of the real process, searches for a second optimum control point for the real process in accordance with a trial-and-error-like optimization algorithm.

Therefore, the optimum point search and determination operation is carried out only within the range where it is ensured that an optimum point exists so that useless search for an optimum point is not carried out and the optimum point is quickly determined.

That is, according to the present invention, the optimum-point searching device searches only in the vicinity of a model optimum point (for example, within a circle) by utilizing the real process so that it does not search for an optimum point in the useless region. Furthermore, the optimum point searching operation gives less external disturbance to the real plant and is quickly terminated.

Moreover, according to the conventional systems, during the search for an optimum point, the process is carried out under adverse conditions for a long period of time, but according to the present invention, not only is the time required for searching for the optimum point short, but also is the searching operation carried out only in the vicinity of the true optimum point so that the process will not be carried out under less adverse conditions.

According to the present invention, since it is furthermore ensured that a true optimum point is located within a circle, even when the evaluation function is temporarily adversely affected within the circle due to a temporary external disturbance which is not significant, if the searching point leaves out of the circle A, it is possible to eliminate such searching point. Therefore the process is not adversely affected by temporary behavior due to sudden external disturbances. Thus, according to the present invention, a system substantially free from external disturbances can be configured.

BRIEF DESCRIPTION OF THE DRAWINGS

In the accompanying drawings.

DESCRIPTION OF THE PREFERRED EMBODIMENT

Figure 3:
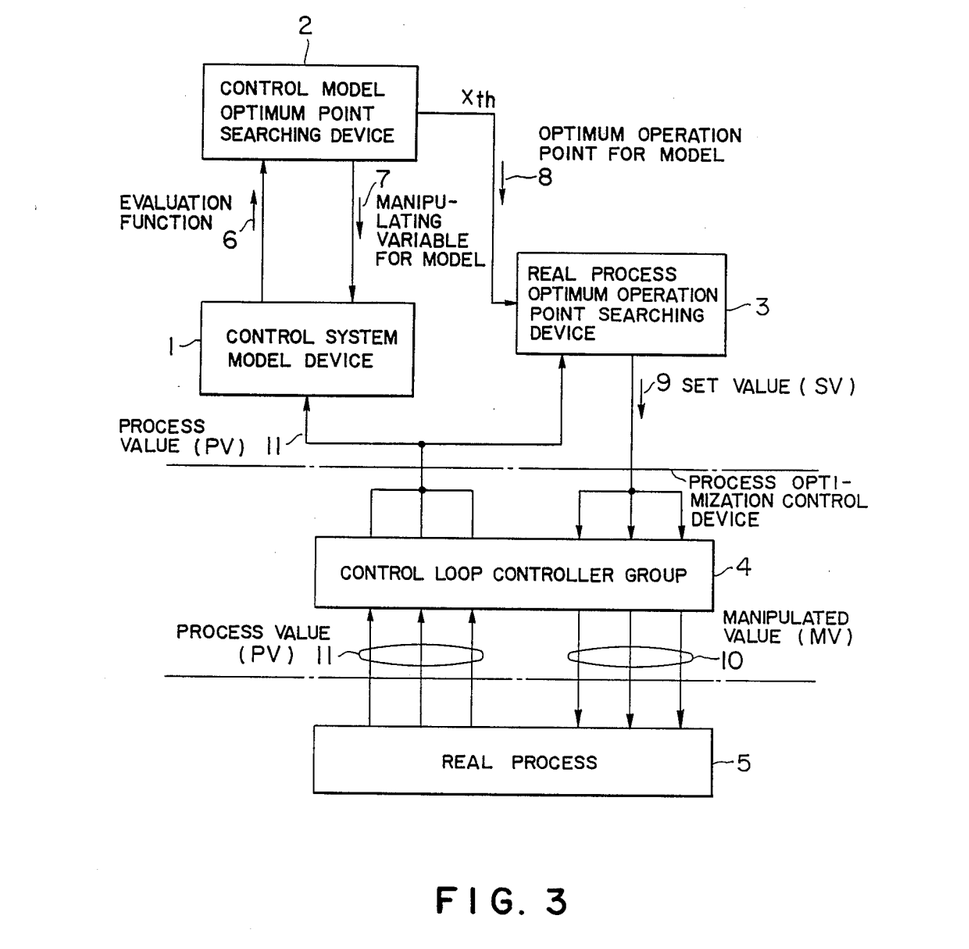
FIG. 3 is a block diagram schematically illustrating an optimized process control apparatus according to the present invention.

FIG. 3 is a block diagram schematically illustrating an optimized process control apparatus in accordance with the present invention which, like apparatuses shown in FIGS. 1 and 2, respectively, interferes with a real process through a control loop controller group 4, but is different in construction from those shown in FIGS. 1 and 2, respectively. That is, the apparatus in accordance with the present invention comprises a control system model device 1 which includes the process model equations as objects and which can simulate the objective control model system; a control model optimum point searching device 2 which is connected to the control system model device in order to find out an optimum control point; and a real process optimum operation point searching device 3 which receives the model optimum point which is the output of the result of the searching and in response to the model optimum point, outputs a set value for the real process. The control system model device includes the model equations which has such a degree of accuracy that no external disturbance is exerted to the control objective process; that is, such a degree of accuracy that the output deviation resulting from giving the same PV to the real process is within a predetermined tolerable range.

The process values (PV) obtained by the operation of the real process based on such set values are delivered to not only the control system model device 1 but also to the real process optimum operation point searching device 3.

Figure 4:
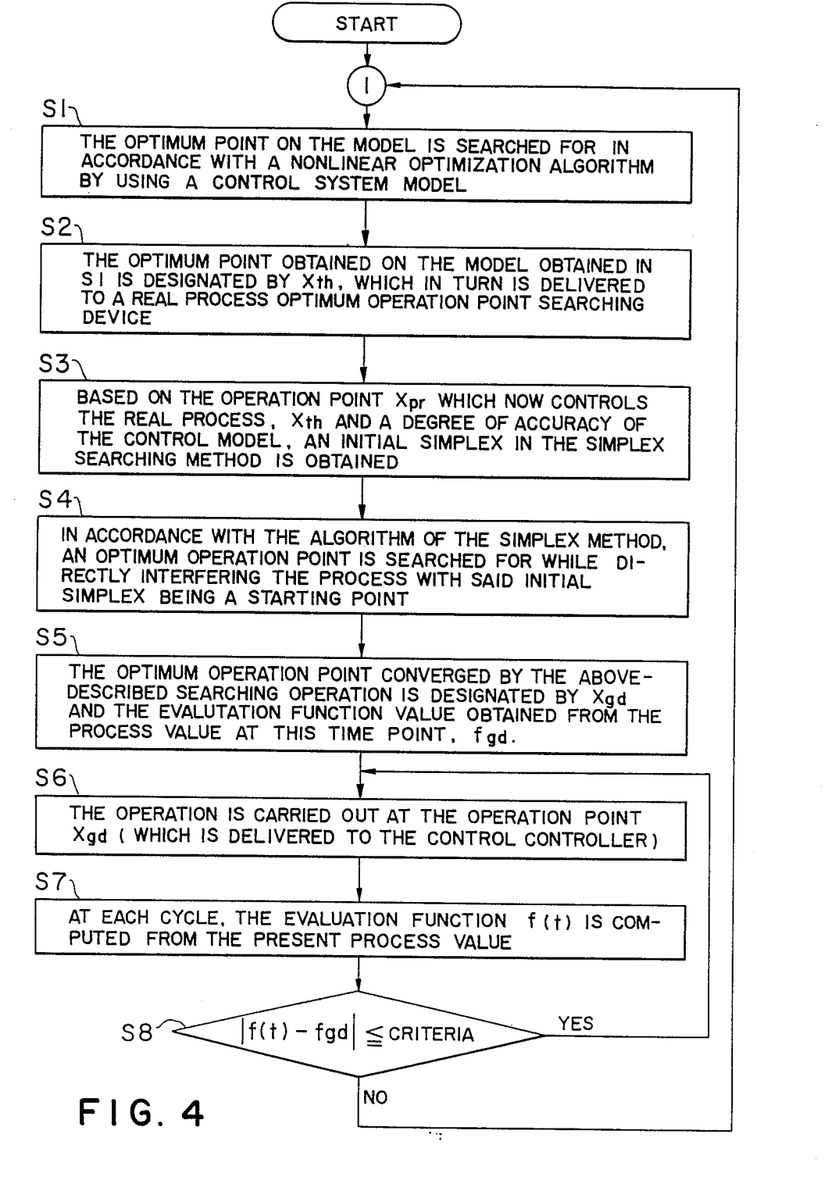
FIG. 4 is a flowchart used to explain the mode of operation thereof.

Next, referring to the flowchart shown in FIG. 4, the optimized process control apparatus with the above described construction will be described in detail hereinafter. In this embodiment, an object plant may be any control system whose practical model is difficult to construct due to complex physical and chemical behavior and is not especially limited to a certain system. However, the present invention will be described when it is applied to the above-described kraft recovery boiler control system in the pulp and paper industry. Even though the process model equations in this system are very complex, but when the physical and chemical principles such as various chemical reactions, thermodynamics, chemical reaction theory, heat balance equations and so on are fully utilized, it is possible to make a model with a practical degree of accuracy which obtains a quantitative output in response to an input. However, it is to be understood that the degree of accuracy obtained in the manner described above does not guarantee that a perfect model be made.

For the sake of easy understanding of the present invention, two manipulated variables which can be shown in a figure; that is, a two-dimensional optimization problem will be described, but the present invention may be equally applied when the number of manipulated variables is n (n-dimensional optimization problem). That is, a circle to be described hereinafter may be replaced by a spherical body of n dimensions.

First, the control model optimum point searching device 2 utilizes the control model device 1 so as to search for an optimum point on the model (Step 1) and delivers the optimum operation point for model 8 obtained by a computer to the real process optimum operation point searching device 3 as $x_{th}$ (Step 2). In the case of searching for the optimum point, not only the simplex method but also various other optimum point searching methods may be used. However, in this embodiment the simplex method is used in order to search for the optimum point for the real process.

Figure 5:
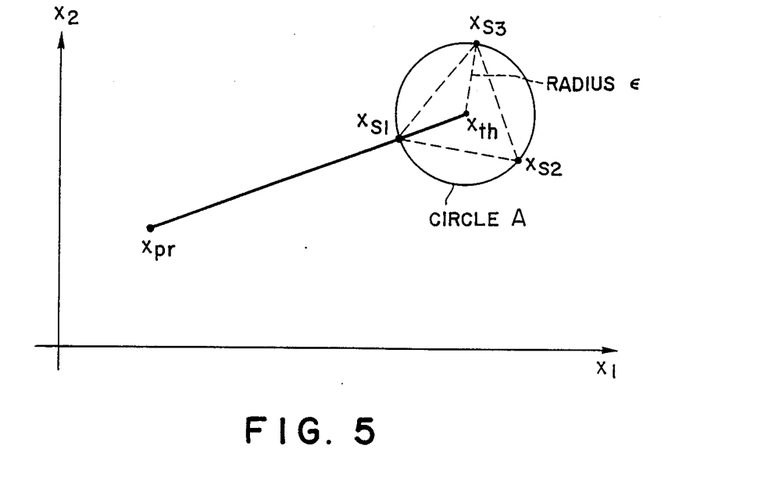
FIG. 5 is a view used to explain how to obtain an optimum point.

Next, it is assumed that the operation point at which the real process is controlled be $x_{pr}$ and the error $\epsilon$ between $x_{th}$ which is defined $x_{pr}$ depending upon a degree of accuracy of the process model equation and the true optimum point, whereby an initial simplex in the simplex searching method is obtained (Step 3). In this case, as shown in FIG. 5, it is guaranteed that the true optimum point is within the circle whose center is the optimum point $x_{th}$ on the model and whose radius is $\epsilon$.

Starting from the initial simplex obtained under the above described conditions, the optimum operation point is searched by using the algorithm of the simplex method while directly interfering the process (Step 4).

Next the searching of the optimum point by the above-mentioned simplex method will be shortly described. This procedure is disclosed in detail by, for instance KONNO Hiroshi et al., "Non-linear Planning Method" (OR library 6), published by NIKKA GIREN PUBLISHING CORP.

Of (n+1) points on $R^n$ (n-dimension), the vertex of the simplex is designated by $x^i R^n$ (i=1, 2, ..., and n+1) and especially the vertices having the following properties are distinguished from other vertices:

$$x^h = \arg_i \max f(x^i)$$

$$x^s = \arg_{i \neq h} \max f(x^i)$$

$$x^1 = \arg_i \min f(x^i)$$

$$\bar{x} = \frac{1}{n} \sum_{i \neq h} x^i$$

As is clear from the above-defined equations, $x^h$ defines a vertex at which f has a maximum value; $x^s$ is a vertex at which f has the second maximum value; $x^1$ is a vertex at which f has a minimum value; and $\bar{x}$ represents the center of a figure or centroid defined by the vertices excluding $x^h$ (the worst point). In the case of the two-dimensions, the simplex has three points which correspond to the above-described three points.

The fundamental operations of the simplex method are defined as follows:

Reflection: A reflection point $x^r$ is defined by X and $x^h$;

$$x^r = (1+\alpha)\bar{x} - \alpha \cdot x^h, \alpha > 0;$$

Expansion: The simplex is expanded in the direction of $x^r$;

$$x^e = \gamma \cdot x^r + (1-\gamma)\bar{x}, \gamma > 1$$

Contraction: $x^h$ converged in the direction of x.

$$x^c = \beta \cdot x^h + (1-\beta)\bar{x}, 0 < \beta < 1.$$

Figure 8A:
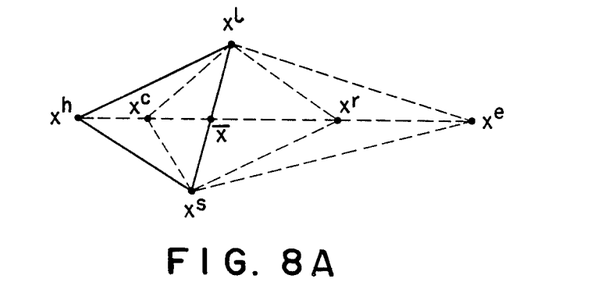
FIGS. 8A and 8B are views used to explain the fundamental mode of operation of the simplex method.

In the case of the two-dimensions, they are shown in FIG. 8A. Reduction: Every vertex is reduced in the direction of $x^1$ $$x^i \leftarrow \frac{1}{2}(x^1 + x^i), \text{ where } i = 1, 2, \ldots, n+1$$

Figure 8B:
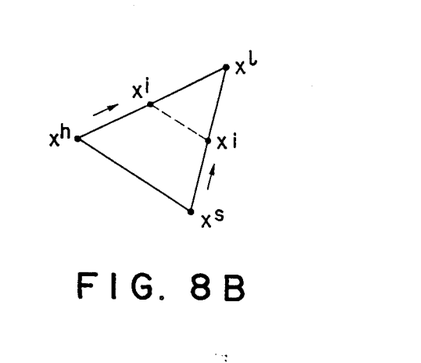

In the case of the two-dimensions, it is shown in FIG. 8B.

Figure 9:
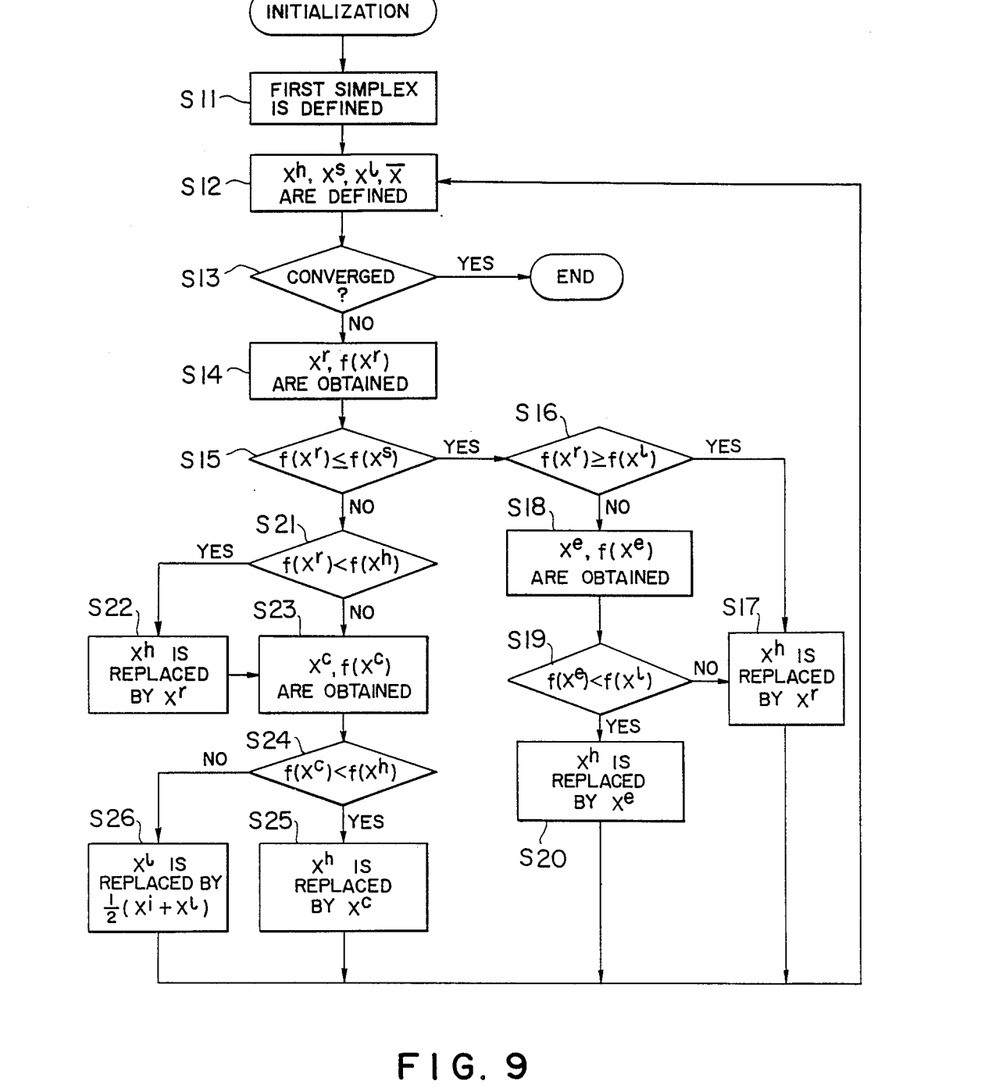
FIG. 9 is a flowchart illustrating an algorithm of an optimum point searching by the simplex method.

FIG. 9 illustrates an algorithm for searching for an optimum point by the simplex method.

First, an initial simplex is defined (Step S11).

Next the maximum point (the worst point) $x^h$, the second maximum point $x^s$ and the minimum point $x^1$ are defined (Step 12). When these values are converged (Step 13), the procedure is terminated. If the procedure is not terminated, the reflection positions $x^r$ and $f(x^r)$ of the worst point $x^h$ with respect to $\bar{x}$ are obtained (Step 14) and are compared with $f(x^r)$ and $f(x^s)$ (Step 15). In this case, if $f(x^r) \leq f(x^s)$ and $f(x^r) \geq f(x^1)$ (Step 16), the worst point $x^h$ is eliminated and $x^h$ is replaced by $x^r$ (Step 17). If $f(x^r) < f(x_1)$ in the Step 16, $x^e$ and $f(x^e)$ are obtained (Step 18) and if $f(x^e) < f(x_1)$ (Step 19), $x^h$ is replaced by $x^e$ (Step 20). If $f(x^e) \geq f(x_1)$, $x^h$ is replaced by $x^r$ (Step 17).

On the other hand, if $f(x^r) > f(x^s)$ and $f(x^r) < f(x^h)$ (Step 21), $x^h$ is eliminated and $x^h$ is replaced by $x^r$ (Step 22). If $f(x^r) \geq f(x^h)$, $x^c$ and $f(x_c)$ on the line interconnecting between $x^x$ and x (Step 24). If $f(x^c) > = f(x^h)$, xi is replaced by $\frac{1}{2}(xi + x_1)$ (Step). 26). If $f(x^c) < f(x^h)$, $x^h$ is replaced by $x^1$.

The values thus obtained determine $x_h$, $\bar{x}^s$ and $x_1$ of a new simplex (Step 12) and the procedure is carried out until it is converged.

More specifically, in the case of the above-mentioned kraft recovery boiler, the simplex method has following three variables:

$x_1$: the quantity of combustion air blown into the bed of the char bed, $x_2$: the quantity of air blown over the surface of the char bed, and $x_3$: the quantity of air blown into the space above the surface of the char bed.

This is three-dimensional optimization. It follows therefore that in order to start searching for an optimum point, four initial points $(x_{11}, x_{21}, x_{31})$, $(x_{12}, x_{22} x_{32})$, $(x_{13}, x_{23}, x_{33})$ and $(x_{14}, x_{24}, x_{34})$ are preferably previously obtained. At each point, the corresponding manipulated values are delivered to the process and after a time interval (about 20-30 minutes) at which the manipulated values influence the process value (PV) after the process is maintained in the steady state, the evaluation function f is obtained from various process values (PV).

Since the procedure is carried out in the manner described above, it takes about eighty to 120 minutes to only obtain the value of f of the initial simplex. After the determination of the initial simplex, the simplex is displaced in accordance with the above-mentioned algorithm so as to output manipulated values to determine f from PV values in a manner substantially similar to that described above. Such procedure described above is repeated until the simplex is converged, whereby the optimum operating conditions can be obtained.

Figure 6:
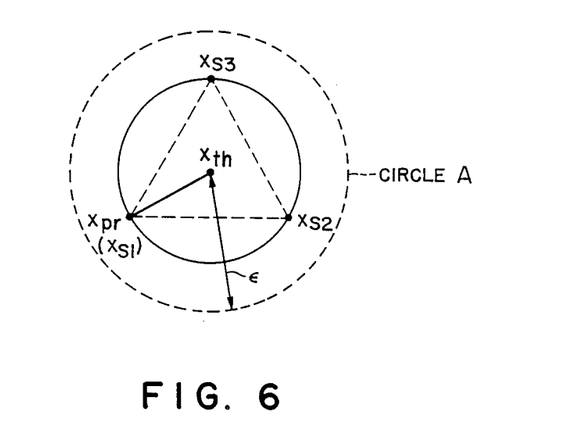
FIG. 6 is a view used to explain a method for obtaining the first simplex.
Figure 7:
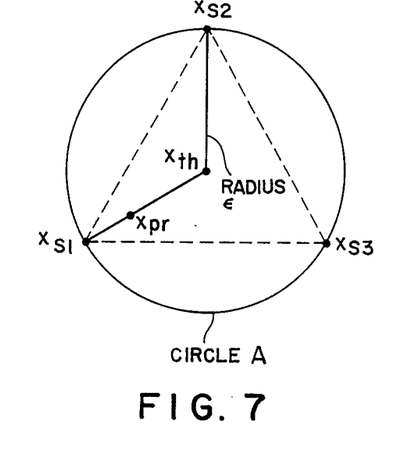
FIG. 7 is a view used to explain another method for obtaining the first, simplex.

Referring next to FIGS. 5-7, the function of the algorithm of the nonlinear simplex method carried out by the real plant optimum operation point searching device 3 will be described.

In the case of FIG. 5, $|x_{pr} - x_{th}| > \epsilon$ is established. As described above, an optimum operation point is assured to be in the circle A with the center $x_{th}$ and the radius $\epsilon$, when the search is made according to the algorithm of the nonlinear simplex method by using the real process itself, the initial simplex is obtained in a manner to be described below.

First, the point $x_{s1}$ of intersection between the circle A and the straight line interconnecting between $x_{th}$ and $x_{pr}$ is obtained and then two points whose distance from the point $x_{s1}$ is equal and whose distance from each other is also equal are obtained and designated by $x_{s2}$ and $x_{s3}$, respectively (FIG. 5). When these three points $x_{s1}$, $x_{s2}$ and $x_{s3}$ are the initial simplex (starting points) in the searching operation by the simplex method, the existence of a true optimum point within the circle A is guaranteed so that, as is clear from the algorithm of the above-mentioned simplex method, only the region within the circle A is searched. As a result, the searching region becomes small and no useless search is made, making the convergence very fast when compared with the conventional techniques.

If $x_{pr}$, is within the circle A with the center $x_{th}$ and the radius $\epsilon$, two methods for obtaining a starting simplex may be considered as described below. According to one method, as shown in FIG. 6, $x_{pr}$ is regarded as the point $x_{s1}$ and two points on a circle whose radius is equal to the distance between $x_{th}$ and $x_{s1}$ and whose distance from the point $x_{s1}$ is equal and also distance from each other is equal, are designated by points $x_{s2}$ and $x_{s3}$, respectively. In this case, if the point $x_{th}$ coincides with the point $x_{pr}$, it is not necessary to carry out the searching for an optimum point and the point $x_{th}$ is defined as the optimum operation point in the real process.

The second method will be described with reference to FIG. 7. As in the case of the condition $|x_{pr}-x_{th}|>\epsilon$, the three points (initial simplex) $x_{s1}$, $x_{s2}$ and $x_{s3}$ are defined.

As described above, even when either the method described above with reference to FIG. 6 or the method described above with reference is used, as in the case of $|x_{pr}-x_{th}|>\epsilon$, the search is made within the circle A so that the convergence is fast.

Referring again to FIG. 4, the operation for searching for an optimum point in accordance with the algorithm of the simplex method described above with reference to FIG. 9 is repeated so as to obtain a converged optimum operation point which is designated by $x_{gd}$ and the value of the evaluation function obtained from the process value at this time point is designated by $f_{gd}$ (Step 5).

The value of $x_{gd}$ is delivered as a set value to the control loop controller group 4 so that the process is carried out at the operating point $x_{gd}$ (Step 6).

Thereafter, at each cycle, the value of the evaluation function f(t) of the process at each time point is obtained from the process value obtained from the result of the operation of the process by the real process optimum operation point searching device (Step 7).

In response to f(t) thus obtained, the value of $|d(t)-f_{gd}|$ is computed and if the result is less than a predetermined criteria, the procedure returns to the step 6 so as to continue the operation. However, if the result $|f(t)-f_{gd}|$ is in excess of the predetermined decision value due to external disturbance, the procedure returns to the step 1 so as to repeat the search for an optimum point on the control system model. The apparatus in accordance with the present invention guarantees that an optimum point for the real operation exists within a circle whose center is $x_{th}$ and whose radius is $\epsilon$ depending on the degree of accuracy of the control model so that no needless search is carried out and the searching operation is not disturbed by external disturbances. The present invention is therefore advantageous when compared with the conventional technique which is applied to, for instance, processes which include a kraft recovery boiler and tend to be very frequently adversely affected by external disturbances so that the searching point tends to fluctuate due to a temporary process behavior resulting from a sudden external disturbances. Furthermore, the method in which an optimum point is searched for in response to the information from the process value obtained from the direct utilization of the real plant is equivalent to the method in a sense in which while external disturbances are imparted to the process, the operation for searching for an optimum point is carried out, so that the process is less likely to be adversely affected by external disturbances and the convergence is very fast, which are advantageous features of the present invention.

So far the real process optimum operation point searching device 3 has been described as the device for searching for an optimum point in accordance with a nonlinear simplex method which is an optimization problem without any limited conditions, but the present invention is especially characterized by the method for obtaining an initial simplex at the start of searching for an optimum point by the simplex method. And the present invention may be equally applied to the method obtained by expanding the simplex method to an optimization problem with limited conditions, for example, the complex method.

What is claimed is:

1. An optimized process control method comprising the steps of:
    delivering an operation variable to a control system model device which includes one or more model equations which are so modeled that the output obtained when the same process value is delivered to a control object process, is within a predetermined tolerable range and which receives the value representative of the condition of a real process;
    receiving an evaluation function which is the result of the arithmetic operation of said one or more model equations, thereby causing said control system model device to carry out an operation for searching for a first optimum control point;
    defining said first optimum point as an initial value and outputting a set value for the real process from a region whose center is said initial value and which is within an allowable degree of error with respect to a true optimum point; and
    in response to said set value, searching for a second optimum point for the real process on the basis of the value representative of the condition of the real process according to a trial-and-error searching optimization algorithm.

2. A method as set forth in claim 1, wherein said trial-and-error searching optimization algorithm is the simplex method.

3. An optimized process control apparatus comprising:
    a control system modeling device which includes one or more model equations which are so modeled that the output obtained when the same process value is delivered to a control object process is within a predetermined range and receives a value representative of the condition in a real process;
    a control model optimum point searching device which receives an evaluation function which is the result of the arithmetic operation by said one or more model equations when an operation variable is delivered to said control system modeling device, thereby searching for a first optimum point with respect to said control system model; and
    a real process optimum operation point searching device which defines said first optimum control point delivered from said control model optimum point searching device, which outputs a set value for the real process from a region whose center is said initial value and which is within an error from a real optimum point and which, in response to the value representative of the condition of the real process, searches for a second optimum control point for the real process in accordance with a trial-and-error-like optimization algorithm.

4. An apparatus as set forth in claim 3, wherein said trial-and-error-like optimization algorithm is the simplex method.

* * * * *